United States Patent [19]

Walter et al.

[11] 4,282,334
[45] Aug. 4, 1981

[54] MANUFACTURE OF HIGH IMPACT AND TRANSLUCENT STYRENE POLYMERS

[75] Inventors: Manfred Walter, Speyer; Dieter Stein, Limburgerhof; Gerhard Fahrbach, Plankstadt; Rudolf Jung, Worms; Adolf Echte, Ludwigshafen, all of Fed. Rep. of Germany

[73] Assignee: BASF Aktiengesellschaft, Fed. Rep. of Germany

[21] Appl. No.: 97,815

[22] Filed: Nov. 27, 1979

Related U.S. Application Data

[63] Continuation-in-part of Ser. No. 933,996, Aug. 16, 1978, abandoned, which is a continuation of Ser. No. 776,223, Mar. 10, 1977, abandoned.

[30] Foreign Application Priority Data

Mar. 29, 1976 [DE] Fed. Rep. of Germany ....... 2613352

[51] Int. Cl.$^3$ ............................................. C08F 279/02
[52] U.S. Cl. ....................................... 525/53; 525/243
[58] Field of Search ......................... 525/53, 243, 316

[56] References Cited

U.S. PATENT DOCUMENTS

| 3,660,535 | 5/1972 | Finch | 525/53 |
| 3,883,616 | 5/1972 | Hozumi | 525/243 |

Primary Examiner—Paul R. Michl
Attorney, Agent, or Firm—Keil & Witherspoon

[57] ABSTRACT

A process for the manufacture of high impact and translucent polystyrene, in which, in a first stage, styrene is prepolymerized in mass or in solution in the presence of a rubber, and the polymerization is then completed in mass, in solution or in aqueous suspension. The prepolymerization is taken to a stage where the amount of styrene converted is from 3 to 10 times the amount of the elastomer constituent of the rubber, and at this conversion the disperse soft-component phase formed should have a mean particle size of less than 1 $\mu$m and should contain from 35 to 65% by weight of free or chemically bonded polystyrene segments. The translucent styrene polymers of high impact strength may be used for packaging purposes.

7 Claims, No Drawings

MANUFACTURE OF HIGH IMPACT AND TRANSLUCENT STYRENE POLYMERS

The present application is a continuation-in-part of application Ser. No. 933,996, now abandoned, which was filed in the United States on Aug. 16, 1978. Application Ser. No. 933,996 was a continuation of copending application Ser. No. 776,223 which was filed on Mar. 10, 1977 and has now been abandoned.

The present invention relates to a process for the manufacture of high impact styrene polymers which are fairly transparent in thin layers.

It has been disclosed that the impact strength of polystyrene can be improved by incorporating a rubbery material into it. To achieve this, the two components can be mixed mechanically or, advantageously, the polymerization of the styrene is carried out in the presence of the rubber.

In the case of the last-mentioned method, the procedure is, in general, to dissolve the rubber in the monomeric styrene and then to polymerize this starting solution, continuously or batchwise, in mass, in solution or in a combined mass/suspension polymerization process. Immediately after the start of the polymerization reaction, the solution, to be subjected to polymerization, of the rubber in the monomeric styrene separates into two phases of which one, namely a solution of the rubber in monomeric styrene, initially forms the continuous phase whilst the other, namely a solution of the resulting polystyrene in its own monomer, remains suspended as droplets in the said phase. With increasing conversion, the amount of the second phase increases at the expense of the first, as the monomer is consumed; as soon as the amount of polystyrene formed exceeds the amount of rubber employed, a change in phase continuity takes place. When this phase inversion occurs, drops of rubber solution are formed in the polystyrene solution; however, these drops of rubber solution, for their part, firmly enclose smaller droplets of what has now become the continuous polystyrene phase. At the same time, a grafting of the rubber by polystyrene chains takes place during this polymerization. As a rule, the polymerization is carried out in several stages. In the first polymerization stage, i.e. the prepolymerization, the solution of rubber in styrene is polymerized, whilst exposed to shear, until a conversion beyond the phase inversion point is reached, and thereafter polymerization is continued, to the desired conversion of styrene, under reduced shear or entirely without shear. Continuous mass polymerization or solution polymerization is described, for example, in U.S. Pat. Nos. 2,694,692, 3,243,481 and 3,658,946. Batchwise combined mass/suspension polymerization is disclosed, for example, in U.S. Pat. No. 3,428,712.

In all these polymerization processes, shearing the reaction mixture in the first process stage, ie. during the prepolymerization, is of particular importance. As is known, for example, from U.S. Pat. No. 3,243,481 and British Pat. No. 1,005,681, the particle size of the disperse soft-component phase is brought to a suitable value, during this prepolymerization, by means of the field of shear forces generated by suitable stirring devices; this particle size is a factor of the greatest importance to the mechanical properties of the resulting polystyrene of improved impact strength. Since the distribution of the disperse soft-component phase can only take place after the phase inversion, the shearing of the polymerization mixture immediately after phase inversion is a deciding factor in adjusting the particle size of the disperse soft-component phase. For this reason, the prepolymerization is as a rule taken to a styrene conversion equivalent to from 1.2 to 2 times the amount of rubber employed. Shearing far beyond the phase inversion, ie. up to a conversion corresponding to more than twice the amount of rubber employed, has no significant influence on the particle size of the disperse soft-component phase and is therefore generally not customary. In addition, the properties of the styrene polymers of improved impact strength can be influenced and varied during the polymerization, for example by using molecular weight regulators or special catalysts.

The high impact styrene polymers, which have been manufactured by these conventional processes thus consist of two phases, namely a homogeneous continuous phase (matrix) of the styrene polymer, in which rubbery particles of the soft component are embedded as the disperse phase. The soft component consists of styrene-grafted rubber particles which contain a greater or lesser amount of occluded matrix material. In the case of high impact styrene polymers which have been optimized in respect of mechanical properties, the scatter in particle size of the disperse soft-component phase, expressed in terms of the diameter, in accordance with Appl. Polymer Symposia 15 (1970) page 74 (d), is from 1 to 5 $\mu$m, and the mean value, ie. the optimum diameter, is thus 3 $\mu$m.

Because of the incompatibility of the rubber phase with the matrix material and because of the size of the rubber particles in the disperse soft-component phase, the high impact styrene polymers, and utensils manufactured therefrom, are cloudy and opaque, so that they are unsuitable, or only partially suitable, for use in certain fields where a certain degree of transparency is desired, for example the packaging field. It is, therefore, of interest to provide styrene polymers of high impact strength which, in addition to the conventional good mechanical properties, exhibit a certain transparency, i.e. are at least translucent.

It has been disclosed that the transparency of high impact thermoplastic polymers can be improved by matching the refractive indices of the hard component and soft component, for example by copolymerization with suitable monomers, e.g. methyl methacrylate. However, this measure fundamentally alters the pattern of properties of such molding compositions, eg. the solvent resistance, the melt flow, the softening range or the mechanical properties. This method of improving the transparency is therefore unsuitable in cases where the field of use demands a certain pattern of properties of the high impact styrene polymers, for example the combination of rigidity and toughness required for use in the packaging field.

It has also been disclosed that the transparency of two-phase systems can be improved by lowering the particle size of the disperse phase to below the wavelength of visible light. However, by merely reducing the diameter of the rubber particles of the disperse soft component phase by appropriate technological methods in the conventional processes for the manufacture of high impact polystyrene it is again not possible to improve the transparency without greatly detracting from the mechanical properties.

It is an object of the present invention to provide a process which permits the manufacture of high impact styrene polymers and which exhibit not only good mechanical properties but also improved transparency. The mechanical properties of the products should substantially correspond to the high impact styrene polymers manufactured by conventional processes, and the products should be at least translucent in thin layers.

We have found, suprisingly, that this object is achieved and that such products are obtained if, during the polymerization of styrene in the presence of the rubber, the shearing during the prepolymerization is carried out in a specific manner and the disperse soft-component phase a particular defined composition after phase inversion at a particular conversion.

Accordingly, the present invention relates to a process for the manufacture of styrene polymers which have been modified with rubber to improve their impact strength, by polymerizing styrene in the presence of the rubber in at least two stages, in which, in the first stage, the styrene, which contains the rubber in solution, is prepolymerized at from 50° to 150° C., in the presence or absence of inert diluents and/or of initiators which form free radicals, whilst breaking up the disperse soft-component phase, which forms during the polymerization, by shearing the polymerization mixture and thereafter, in one or more further stages, the polymerization is completed by taking it to the desired conversion with reduced shearing or entirely without shearing, in mass, in solution or in aqueous suspension. The process is characterized in that, during the prepolymerization 1. the shearing of the polymerization mixture to break up the disperse soft-component phase which forms is maintained until the amount of styrene converted, based on the starting solution to be polymerized, corresponds to from 3 to 10 times the elastomer constituent of the total amount of rubber employed, the particles of the disperse soft-component phase thus formed, having a weight-average mean diameter of less than 1 $\mu$m, and at the same time
2. the prepolymerization is carried out such that, when the amount of styrene converted corresponds, based on the starting solution to be polymerized, to at least one value in the range of from 3 to 10 times the elastomer constituent of the total amount of rubber employed, the entire disperse soft-component phase contains from 35 to 65 percent by weight, based on the entire soft-component phase at this conversion, of free or chemically bonded polystyrene segments, with at least 50 percent by weight of these polystyrene segments of the soft-component phase being incorporated into the rubber component in a chemically bonded form, as a polymer block or grafted branch, and having a number-average molecular weight of at least 30,000.

Rubbers which can be employed in the process according to the invention are the natural or synthetic rubbers conventionally used for the manufacture of high impact styrene polymers. Suitable rubbers are not only natural rubber but also, for example, polybutadiene, polyisoprene and copolymers of butadiene and isoprene with one another or with styrene and/or other comonomers, these copolymers preferably having a glass transition temperature below −20° C. The rubbery copolymers of butadiene and/or isoprene may contain the monomers either in random distribution or as blocks. Further suitable rubber components for the process according to the invention for the manufacture of high impact styrene polymers are rubbery ethylene-propylene copolymers and ethylene-propylene-diene terpolymers.

The elastomer constituents of a rubber is to be understood as the total amount of the rubber minus any chemically bonded constituent comprising a glassy thermoplastic, eg. polystyrene, in, for example, the form of blocks or grafted branches. The elastomer content of a styrene-butadiene block copolymer containing 30% of polystyrene blocks is accordingly 70%. This applies even if, over and above the 30% of polystyrene blocks, the polybutadiene constituent contains further styrene units in random distribution.

The preferred rubber to use is a homopolymer of a conjugated diene of 4 to 6 carbon atoms, especially polybutadiene. Elastomeric styrene-diene block copolymers or styrene-diene graft copolymers are equally suitable. The graft copolymers contain polystyrene side branches grafted onto a polydiene, preferably polybutadiene, as the substrate. In the block copolymers, the transition between the individual blocks may be sharp or blurred; in particular, block copolymers of the general formula A—B or A—B—A may be used. In these formulae, A is a homopolystyrene block and B a homopolymer block of a conjugated diene of 4 to 6 carbon atoms, especially butadiene, or a copolymer block of a conjugated diene, especially butadiene, with styrene, with random distribution of the monomers. The rubbers may be used individually or as mixtures with one another. The total amount of rubber employed should, however, at most contain 55 percent by weight of homopolystyrene segments in the form of blocks.

To carry out the process according to the invention, the rubber is first dissolved in the monomeric styrene, and this starting solution is then polymerized. In general, the rubber component is employed in amounts of from 1 to 20 percent by weight, preferably in amounts of from 2 to 15 percent by weight, based on the starting solution to be polymerized.

The starting solution is polymerized in at least two stages; in the first stage the monomeric styrene, which contains the rubber in solution, is prepolymerized in mass or in solution, under the action of shearing forces, and thereafter the polymerization is completed in one or more subsequent stages, under reduced shear or entirely without shear, in mass, solution or aqueous suspension.

The prepolymerization in the first process stage is carried out at from 50° to 150° C. The polymerization can be started thermally or by means of initiators which form free radicals. In the case of mass polymerization, the monomeric styrene, containing the rubber in solution, is polymerized directly; in the case of solution polymerization, up to at most 50 percent by weight, preferably up to 30 percent by weight, based on monomeric styrene employed, of an inert diluent are also added to this starting solution. Usually, at least 2 percent by weight, preferably from 5 to 10 percent by weight, of the inert diluent, based on the monomeric styrene employed, are used. Examples of suitable inert diluents are aromatic hydrocarbons or mixtures of aromatic hydrocarbons which are liquid at the polymerization temperature. Toluene, ethylbenzene, the xylenes or mixtures of these compounds are preferred. If appropriate, auxiliaries and additives, e.g. molecular weight regulators, lubricants and the like, may be added to the polymerization batch.

The reaction mixture obtained from the prepolymerization in the first stage is then finally polymerized to the desired conversion, either in mass or in solution, in one or more further stages, suitably at up to 200° C., or is suspended in water in the presence of the known conventional water-soluble suspending agents, e.g. methylcellulose, polyvinyl alcohol, partially saponified polyvinyl acetates, polyvinylpyrrolidone and the like, or inorganic dispersing agents, e.g. barium sulfate, the suspending or dispersing agents in general being employed in amounts of from 0.1 to 5 percent by weight, based on the organic phase, and is then finally polymerized, as a rule at from 40° to 160° C. If the second process stage is carried out in aqueous suspension, the addition of inert diluents in the first process stage is generally dispensed with. In this combined mass/suspension process the polymerization is usually initiated by adding oil-soluble initiators which decompose to give free radicals, eg. benzoyl peroxide, dicumyl peroxide, ditert.-butyl peroxide, azodiisobutyronitrile and the like or combinations thereof; the prepolymerization can also be started thermally, and in this latter case it is possible only to add the oil-soluble initiators in the second process stage, when carrying out the polymerization in aqueous suspension. After completion of the polymerization, the end products obtained are worked up in the conventional known manner.

An essential feature of the process according to the invention is how the process is carried out in the first stage, during the prepolymerization, which according to the invention should be taken to the point where the amount of styrene converted corresponds to from 3 to 10 times the elastomer constituent of the total amount of rubber employed, these amounts being in each case based on the starting solution to be polymerized. In order to achieve products having the desired pattern of properties it is necessary, on the one hand, deliberately to adjust the particle size of the disperse soft-component phase being formed, by the action of an appropriate field of shearing forces, whilst on the other hand the reaction conditions must be balanced so that at the same time the disperse soft-component phase has a specific composition in this range of conversion. Soft component, for the purpose of the present invention, means the constituent which is toluene-insoluble at room temperature (25° C.), of the high impact polymer minus any pigments which may be present. Accordingly, the soft component corresponds to the gel content of the product and consists, as has been explained at the outset, both of the grafted rubber component and of the part of the matrix material (polystyrene) which has been mechanically included in the grafted rubber particles.

The action of shearing forces on the reaction mixture in the first process stage, in order to break up the disperse soft-component phase after phase inversion, is maintained, according to the invention, until the amount of styrene converted corresponds to from 3 to 10 times the elastomer constituent of the total amount of rubber employed, the amounts in each case being based on the starting solution to be polymerized. The shearing of the polymerization mixture can be achieved in the conventional manner, by appropriate stirring devices. The particle size of the disperse soft-component phase depends on the rate of stirring, ie. on the shearing stress; the higher the latter, the lower the particle size. The relation between rate or stirring and size and distribution of the disperse soft-component particles formed is in itself known and is described, for example, in U.S. Pat. No. 3,243,481 or by Freeguard, British Polymer Journal 6 (1974), 205 to 228. According to the invention, the shearing should be carried out so that subsequently the particles of the disperse soft-component phase have a weight-average mean diameter of less than 1 $\mu$m together with a narrow particle size distribution. In general, the weight-average mean particle diameter of the particles of the soft-component phase should be from 0.05 to 1 $\mu$m, preferably from 0.2 to 0.6 $\mu$m. With larger particle diameters, the translucency of the products progressively decreases. The mean particle diameter of the rubber particles of the disperse soft-component phase can be determined, for example, by counting and evaluating electromicrographs of thin layers (cf. F. Lenz, Zeitschrift für Wiss. Mikroskopie 63 (1956), 50–56). The rate of stirring required to achieve the desired particle size depends, inter alia, on the details of the particular apparatus and is known to those skilled in the art or can be established by a few simple experiments.

A further essential feature of the process according to the invention is that, in addition to maintaining the shearing conditions in the first process stage, the first process stage must be controlled so that the disperse soft-component phase contains—when the amount of styrene converted is from 3 to 10 times the elastomer constituent of the total amount of rubber employed, the amount being in each case based on the starting solution to be polymerized—a total of from 35 to 65 percent by weight of polystyrene in the form of chemically bonded blocks or grafted branches or at times also as free homopolymer in an emulsified form.

At least 50 percent by weight of this polystyrene component which is required to be present in the total disperse soft-component phase at the stated conversion must, however, be contained as chemically bonded polystyrene segments in the rubber component and must have a number-average molecular weight of at least 30,000, preferably at least 50,000. The number-average molecular weight of the polystyrene segments of the soft-component which are present chemically bonded as a polymer block or grafted branch in the rubber is in general less than 250,000, preferably less than 150,000. The total homopolystyrene content of the disperse soft component can be determined on a sample, taken from the reaction mixture at the appropriate conversion, by means of the conventional analytical methods, for example by IR spectroscopy. The chemically bonded content of polystyrene segments in the soft component is determined on rubbers containing polybutadiene by first extracting free homopolystyrene with a mixture of methyl ethyl ketone and acetone and then degrading the polybutadiene part of the residual material by means of $OsO_4$ (see, eg. G. Locatelli and G. Riess, Die Angew. Makrom. Chem. 26 (1972), pages 117–127).

The polystyrene content in the disperse soft-component phase, at a styrene conversion within the stated range, may be adjusted in various ways, and may, for example, be controlled by the polymerization temperature, the amount and nature of the initiators, the presence or absence of molecular weight regulators and the like. It depends, in particular, on the nature of the rubber component employed.

If, for example, the process according to the invention employs a rubber which does not contain any homopolystyrene segments in the form of blocks, such as, for example, a homopolymer of a conjugated diene, especially polybutadiene, it is necessary, in order to achieve the desired composition of the soft component, to carry out the prepolymerization in the first process stage under conditions which favor the grafting of the styrene onto the rubber. In that case, the prepolymerization is not carried out under the conventional conditions, thermally or in the presence of initiators at low temperatures; instead, the polymerization in the first process stage is carried out at relatively high temperatures in the presence of initiators which form free radicals, especially initiators which are known to favor grafting. The choice of the polymerization temperature depends above all on the initiator employed; in general, the temperature is above 100° C. In such a case, the prepolymerization is generally carried out at temperatures such that the half-life of the free radical initiator employed, at the polymerization temperature and in the polymerization solution, is less than 30 minutes, preferably less than 5 minutes. The concentration of the initiator is from 0.001 to 1.0 mole percent, preferably from 0.005 to 0.5 mole percent, based on the amount of monomeric styrene employed. The conventional initiators, eg. alkyl peroxides, acyl peroxides, hydroperoxides, peresters, peroxycarbonates, azo compounds and the like, can be employed; initiators which favor grafting, eg. benzoyl peroxide, are preferred. The decomposition of the initiators can also be accelerated by suitable additives or appropriate measures.

The procedure just described is applicable not only when using rubbers consisting of homopolymers of conjugated dienes, but is in principle applicable in the same manner to all rubbers which do not contain styrene and to rubbery copolymers of a conjugated diene, especially butadiene, with styrene, in which the monomer units are distributed at random. In this process it is also possible to employ block copolymers or graft copolymers of a conjugated diene, especially butadiene, with styrene, provided the block polystyrene content of the copolymer, ie. the proportion of polystyrene segments present as polymer blocks or grafted branches in the copolymer, is less than 25 percent by weight, based on the block or graft copolymer; if this is not the case, there is the risk that the polystyrene content of the disperse soft-component phase may, during the prepolymerization, be above the limiting value admissible according to the invention, in which case products having the desired pattern of properties would no longer be obtained.

When using a block copolymer or graft copolymer of butadiene and styrene whch has a block polystyrene content of from 10 to 40 percent by weight, and in which the number-average molecular weight of these block polystyrene segments is more than 30,000, preferably more than 50,000, as the rubber, the content of polystyrene segments in the disperse soft-component phase within the stated range of conversion of the monomeric styrene can also be brought to the value of from 35 to 65 percent by weight, required according to the invention, by adding to the starting solution, to be polymerized, of this block copolymer or graft copolymer in monomeric styrene, a homopolystyrene styrene which has a molecular weight equal to or lower than the molecular weight of the block polystyrene segments in the block copolymer or graft copolymer. The prepolymerization of the starting solution can then be carried out, in respect of temperature control and catalyst addition, under the conventional conditions normally employed for the manufacture of high impact styrene polymers. During the polymerization, the homopolystyrene added to the starting solution is incorporated into the polystyrene domains of the butadiene/styrene block copolymers or graft copolymers and is thus ultimately contained in the disperse soft-component phase, thereby increasing its content of bonded or emulsified polystyrene. The amount of homopolystyrene which is additionally introduced into the starting solution, to be polymerized, of the block copolymer or graft copolymer in monomeric styrene depends on the block polystyrene content of the block copolymer or graft copolymer used. It must be so chosen that the sum of the block polystyrene content of the block copolymer or graft copolymer and the additionally introduced homopolystyrene is at least 20 percent by weight, preferably at least 25 percent by weight, and at most 55 percent by weight, preferably at most 50 percent by weight, in each case based on the sum of block copolymer or graft copolymer and additionally introduced homopolystyrene.

Further, it is possible to obtain the required content of polystyrene segments in the disperse soft-component phase by employing, as the rubber, a block copolymer or graft copolymer of a conjugated diene, especially butadiene, and styrene, which contains from 25 to 55 percent by weight, based on the block copolymer or graft copolymer, of polystyrene blocks and in which the number-average molecular weight of the block polystyrene segments is at least 30,000, preferably at least 50,000. The number-average molecular weight of the block polystyrene segments is in general less than 250,000, preferably less than 150,000. If block copolymers with a blurred transition between the polydiene blocks and the polystyrene blocks are used, the transition range must be included, for calculation purposes, with the polydiene block, ie. with the elastomer constituent of the rubber, so that only the pure homopolystyrene segments are treated as the polystyrene block constituent. The prepolymerization in the first process stage can in this case be carried out under the conventional conditions in respect of temperature regime and of catalyst employed, since, under these conditions, sufficient polystyrene is grafted onto the rubber component and is occluded by the rubber particles during phase inversion to give a total content of polystyrene segments, contained in the disperse soft-component phase in the critical range of conversion of the monomeric styrene, of from 35 to 65 percent by weight, based on the total disperse soft-component phase at this conversion. If block copolymers or graft copolymers of conjugated dienes and styrene having a high block polystyrene content, of more than 55 percent by weight, based on the block copolymer or graft copolymer, are employed, the proportion of polystyrene segments in the disperse soft-component phase at the conversion in question is always above the range required according to the invention, and accordingly products having improved transparency are not obtained.

Such elastomeric block copolymers or graft copolymers of conjugated dienes and styrene, having a high content of block polystyrene, above from about 50 to 55 percent by weight, can however be used as the rubber in the process according to the invention if they are employed as a mixture with a homopolymer of the corresponding conjugated diene. This mixture of block copolymer or graft copolymer and homopolymer of the conjugated diene then forms the total rubber component. The proportion of homopolymer of the conjugated diene in this mixture depends on the block polystyrene content of the block copolymer or graft copolymer and is so chosen that the proportion of block polystyrene in the rubber mixture employed is at least 20 percent by weight, preferably at least 25 percent by weight and at most 55 percent by weight, preferably at most 50 percent by weight, based on the rubber mixture. The proportion of the homopolymer of the conjugated diene in the total rubber mixture should, however, in general not exceed 50 percent by weight, based on the rubber mixture. We have found that such a rubber mixture behaves in the process as if it were a block copolymer or graft copolymer having a corresponding content of block polystyrene and accordingly can be used under the same conditions as the latter in the process according to the invention.

It is also possible to add a molecular weight regulator during the prepolymerization (started thermally or by means of initiators which form free radicals) of the starting solution, in order thereby to control the proportion of polystyrene grafted onto the rubber, and the molecular weight of the polystyrene, in accordance with the invention. The molecular weight regulator, the transfer constant of which should be at least 1, preferably from 2 to 15, under the reaction conditions is added, preferably in amounts of at least 0.1 percent by weight, based on the monomeric styrene employed, to the starting solution at the beginning of, or during, the prepolymerization, prior to the phase inversion.

In general, it can be stated that the prepolymerization in the first stage of the process can be carried out in principle in any desired manner, provided the two conditions according to the invention, namely those relating to the shearing of the polymerization mixture and to the composition of the disperse soft-component phase, are fulfilled. The manner in which the polymerization is completed in the second process stage and possibly further process stages is not essential to the invention. As has already been described, this final polymerization is carried out in mass, in solution or in aqueous suspension and employs the conventional procedures, such as are described, for example, in the publication cited initially, which are herein incorporated by reference.

The high impact styrene polymers which are manufactured in accordance with the invention have improved transparency compared to conventional high impact polystyrenes, i.e., they are translucent and even transparent in thin layers, without this improvement being accompanied by a deterioration of the level of mechanical properties of the materials compared to comparable conventional products which are not translucent. In addition, finished articles made from the products manufactured according to the invention exhibit a high gloss. The high impact styrene polymers, obtained in accordance with the present invention are therefore particularly suitable for use in the packaging field. When used for this purpose, they may contain the conventional additives and auxiliaries.

The Examples which follow illustrate the invention. Parts and percentages are by weight, unless stated otherwise. The products are tested in accordance with the following methods:

1. Yield stress (N/mm$^2$) and tensile strength (N/mm$^2$) were determined on a molded dumbbell-shaped bar according to DIN 53,455.
2. Notched impact strength (kJ/m$^2$): DIN draft based on the decision of the German Special Standards Committee for Plastics 4.3 of March 1975, in preparation.
3. The weight-average mean particle size of the disperse soft-component phase was determined by counting and averaging the particles belonging to the same size category (constant interval width), using thin layer electromicrographs. The cumulative distribution curve is determined from the volumes of the particles (3rd power of the apparent diameter) within the various intervals. The equivalent diameter can then be read off on the abscissa at the point corresponding to the 50% ordinate value. The mean diameters quoted represent a mean value for at least 5,000 particles.
4. For assessing the transparency, the turbidity $\tau$, i.e. the fraction of scattered light per cm path length, was used in accordance with $I = I_0 e^{-\tau \cdot d}$, where d is the path length. (The absorption was ignored.) For this purpose the transmission $I/I_0$ was determined using round injection-molded discs 1 mm thick with a Shimadzu double-beam spectrophotometer (type UV 190) with monochromatic light having a wavelength of $\lambda^d_{Na} = 589$ nm. The measured values were converted to a layer thickness of 1 cm. The value O for the turbidity coefficient is obtained for a turbidity-free clear material. The claimed upper limit of $\tau = 40$/cm corresponds to a measured transmission of 1.8% based on a 1-mm tick sample.

Surface reflection was eleminated by embedding the samples in oil with $n_D = 1.522$.

COMPARATIVE EXAMPLE A

A 4% strength solution of polybutadiene (molecular weight 180,000; 1,2-vinyl content = 10%) in styrene was mixed with 0.088 mole percent (based on styrene) of benzoyl peroxide and was prepolymerized, whilst stirring, in a reaction kettle, at 80° C., to give a solids content of 36% $\triangleq$ 33.3% styrene conversion). 0.1 percent by weight (based on polybutadiene+styrene) of dicumyl peroxide was then dissolved in the polymer solution. A 3-fold amount of water, containing 0.64 percent by weight of sodium carboxymethylcellulose as the protective colloid was then added and the polymer solution was suspended therein. The reaction batch was then polymerized to a solids content of >99%, with continued stirring, over 5 hours at 120° C. and 5 hours at 140° C.

The polystyrene of high impact strength, thus obtained, is cloudy and opaque. The turbidity coefficient, $\tau$, was 68/cm. The particles of the soft component have a mean diameter of about 4 $\mu$m. The properties are shown in Table 1.

EXAMPLE 1

The same batch as that used in Comparative Example A was heated, whilst stirring. The heat liberated when the polymerization starts was initially not removed, i.e. the polymerization was carried out adiabatically; in the course of a few minutes, the temperature of the polymerization batch rose to 140° C. The batch was then cooled intensively and its temperature lowered to 70°–80° C. After the prepolymerization, the solids content was 36.5% $\triangleq$ 33.9% styrene conversion). 0.1 percent by weight (based on the amount of polybutadiene +styrene) of dicumyl peroxide was then added and after addition of the aqueous phase the polymerization was completed as described in Comparative Example A. The resulting polystyrene of high impact strength is very translucent, and even transparent as a thin layer ($\tau = 18c$). The particles of the disperse soft-component phase have a diameter of $\leq 0.5$/um. The properties are shown in Table 1.

COMPARATIVE EXAMPLE B

A mixture of 4 parts of polybutadiene, 6 parts of ethylbenzene and 90 parts of styrene was mixed with 0.04 mole percent (based on styrene) of benzoyl peroxide and prepolymerized continuously in a tubular reactor at about 75° C., to give a solids content of 6.5% (≙ 2.8% styrene conversion). The polymer solution was then polymerized, as part of the prepolymerization process, to 41.8% solids content in an apparatus as described in German Laid-Open Application DOS No. 1,770,392 and then polymerized to a solids content of 79% ≙ 83.3% styrene conversion); finally the residual styrene and the solvent were distilled off under pressure at above the softening point of polystyrene. The polystyrene melt was forced through a die and the strand which issued was granulated. The resulting polystyrene of high impact strength (polybutadiene content =6%) was opaque ($\tau$=71/cm). The disperse sofe-component phase was in the form of particles having a diameter of from about 2 to about 5μm.

If higher solids contents were achieved in the prepolymerization in the tubular reactor, there was no fundamental change in the pattern of properties (compare Table 1).

EXAMPLE 2

The same mixture as in Comparative Example B was prepolymerized in the tubular reactor, at about 130° C., to a solids content of 17% (≙14.4% styrene conversion). The final polymerization and working up were carried out as described in Comparative Example B.

The resulting polystyrene of high impact strength (polybutadiene content =6%) is very translucent ($\tau$=21/cm), and even transparent in thin layers. The soft-component phase has a particle size of from 0.3 to 0.5/μm.

TABLE 1

| Example/Comparative Example | A | 1 | B | 2 |
|---|---|---|---|---|
| Polystyrene content of the soft component, % | 28.6 | 39.4 | 26.9 | 40.8 |
| Styrene converted/elastomer constituent of the rubber | 8.0 | 8.13 | 9.45 | 9.45 |
| Yield stress (N-mm$^2$) | 32.3 | 36.3 | 28.3 | 31.9 |
| Notch impact strength (kJ/m$^2$) | 7.9 | 7.1 | 11.2 | 10.1 |
| Turbidity = (cm$^{-1}$) | 68 | 18 | 71 | 21 |

In the Examples which follow, the products shown below were used as rubbers:

W1: Bu/S block copolymer with a blurred transition between the
  blocks: [$\eta$]=1.51 (dl/g) (toluene, 25° ); Block PS=24.4%; [$\eta$[=0.264 (dl/g) (toluene, 25° ); Total styrene content =41.0%.

W2: Bu/S block copolymer with a blurred transition between the blocks: [$\eta$]=1.76 (dl/g) (toluene 25° ); Block PS=27.7%; [$\eta$]=0.334 (dl/g) (toluene, 25° ); Total styrene content =41.0%.

W3: Bu/S block copolymer with a blurred transition between the blocks; [$\eta$]=1.74 (dl/g) (toluene, 25° ); Block PS=31.0%; [$\eta$]=0.364 (dl/g) (toluene, 25° C.); Total styrene content =41.6%.

W4: Bu/S block copolymer with a blurred transition between the blocks: [$\eta$]=1.58 (dlg) (toluene, 25° ); Block PS=39.4%; [$\eta$]=0.470 (dl/g) (toluene, 25° ); Total styrene content =40.5%.

W5: Bu/S block copolymer with sharply separated blocks: [$\eta$]=1.64 (dl/g) (toluene, 25° ); Block PS=32.4%; [$\eta$]=0.337 (dl/g) (toluene, 25° ); total styrene content =32.4%.

W6: Bu/S block copolymer with sharply separated blocks: [$\eta$]=2.70 (dl/g) (toluene, 25° ); Block PS=70%; [$\eta$]=1.67 (dl/g) (toluene, 25° ); Total styrene content =70%.

Bu: butadiene; S: styrene; PS: polystyrene; [$\eta$]: intrinsic viscosity, measured in toluene at 25° C.

The polystyrene of high impact strength was manufactured batchwise by mass/suspension polymerization. The results are shown in Tables 2 and 3.

COMPARATIVE EXAMPLE C

A solution consisting of 1,560 g of styrene, 240 g of W3, 1.6 g of t-dodecylmercaptan, 2.2 g of Irganox 1076 and 1.7 g of dicumyl peroxide was prepolymerized at 110° C. internal temperature in a 5 l stirred kettle with a blade stirrer, at a stirrer speed of 150 rpm, until the solids content was 28.7%. Accordingly, the styrene conversion was about 1.7 times the elastomer constituent of the W3 rubber used.

1,800 ml of water containing 9.0 g of polyvinylpyrrolidone of K value 90 and 1.8 g of Na$_4$P$_2$O$_7$ were then added and the stirrer speed was increased to 300 rpm. The final polymerization was then carried out for 5 hours at 120° C. and 5 hours at 140° C., giving a styrene conversion of >99% ($\tau$=63/cm).

EXAMPLE 3

The batch, and the reaction conditions, were the same as in Comparative Example C, except that the prepolymerization was taken to a solids content of 43.8%, whilst stirring, and the aqueous phase was only added then. This corresponds to a styrene conversion which is about 3.3 times the elastomer constituent of the W3 rubber used ($\tau$=12.6/cm).

EXAMPLE 4

In contrast to Example 3, W4 was used as the rubber. The solids content after the prepolymerization was 49.7%; this corresponds to a styrene conversion of about 4.5 times the elastomer constituent of the W5 rubber used ($\tau$=12.8/cm).

COMPARATIVE EXAMPLE D

A solution consisting of 1,260 g of styrene, 201 g of W5, 37 g of mineral oil as the lubricant, 1.5 g of t-dodecylmercaptan, 1.8 g of Irganox 1076 and 1.6 g of dicumyl peroxide was prepolymerized at 115° C. internal temperature in a 1 l stirred kettle with a blade stirrer, at a stirrer speed of 200 rpm, until the solids content was 34.2%. Accordingly, the styrene conversion was about 2.3 times the elastomer constituent of the W5 rubber used ($\tau$=64/cm).

The aqueous phase and the post-polymerization conditions correspond to the data in Comparative Example C.

EXAMPLE 5

The same batch as in Comparative Example D was prepolymerized under the same conditions, to a solids content of 47.6%. Accordingly, the styrene conversion was about 3.8 times the elastomer constituent of the W5 rubber used ($\tau$=15/cm).

EXAMPLE 6

A solution consisting of 1.605 g of styrene, 150 g of W4, 45 g of mineral oil 1.8 g of t-dodecylmercaptan, 2.2 g of Irganox 1076 and 1.8 g of dicumyl peroxide was prepolymerized at 115° C. internal temperature in a 5 l stirred kettle with a blade stirrer, at a stirrer speed of 200 rpm, until the solids content was 46.5%. Accordingly, the styrene conversion was about 6.6 times the elastomer constituent of the W4 rubber used ($\tau=10.6$/cm).

The aqueous phase, and the post-polymerization details, were as in Comparative Example C.

COMPARATIVE EXAMPLE E

A solution consisting of 1,600 g of styrene, 200 g of W1, 1.8 g of t-dodecylmercaptan, 2.2 g of Irganox 1076 and 1.8 g of dicumyl peroxide was prepolymerized at 115° C. internal temperature in a 5 l stirred kettle with a blade stirrer, at a stirrer speed of 200 rpm, until the solids content was 43.2%. Accordingly, the styrene conversion was about 3.8 times the elastomer constituent of the W1 rubber used ($\tau=79$/cm).

The aqueous phase, and the post-polymerization details, were as in Comparative Example C.

EXAMPLE 7

0.3%, based on styrene, of benzoyl peroxide was added, to act as a starter which favors grafting, to the same reaction batch as that described in Comparative Example E.

Prepolymerization was carried out at from 80° C. to 85° C. and a stirrer speed of 200 rpm, until the solids content was 42.9%. Accordingly, the styrene conversion was about 4.2 times the elastomer constituent of the W1 rubber used ($\tau=23$/cm). The aqueous phase, and the post-polymerization details, were as in comparative Example C.

EXAMPLE 8

A solution consisting of 1,600 g of styrene, 170 g of W1, 30 g of polystyrene with $[\eta]=0.252$ (dl/g) in toluene, 1.8 of t-dodecylmercaptan, 2.2 g of Irganox 1076 and 1.8 g of dicumyl peroxide was prepolymerized at 115° C. internal temperature in a 5 l stirred kettle with a blade stirrer, at a stirrer speed of 200 rpm, until the solids content was 43.1%. Accordingly, the styrene conversion was about 4.5 times the sume of the W1 rubber component used and the polystyrene used. Assuming that the added polystyrene is completely taken up in the polystyrene domains of W1, the "block" polystyrene content of W1 is altered from 24.4% to 35.7% ($\tau=21$/cm).

The aqueous phase, and the post-polymerization details, were as in Comparative Example C.

EXAMPLE 9

A solution consisting of 1.605 g of styrene, 120 g of W4, 30 g of polybutadiene (molecular weight ~200,000; 1,2-vinyl content ~10%), 45 g of mineral oil, 1.8 g of t-dodecylmercaptan, 2.2 g of Irganox 1076 and 1.8 g of dicumyl peroxide was prepolymerized at 115° C. internal temperature in a 5.1 stirred kettle with a blade stirrer, at a stirrer speed of 200 rpm, until the solids content was 38.9%. Accordingly, the styrene conversion was about 5.4 times the sume of the elastomer constituent in the W4 rubber used and the polybutadiene used. Assuming that the added polybutadiene is completely taken up in the polybutadiene domains of W4, the block polystyrene content of W4 is altered from 39.4% to 31.5% ($\tau=15$/cm).

The aqueous phase, and the post-polymerization details, were as in Comparative Example C.

EXAMPLE 10

A solution consisting of 1,650 g of styrene, 75 g of W6, 75 g of polybutadiene (as in Example 9), 1.8 g of t-dodecylmercaptan, 2.2 g of Irganox 1076 and 1.8 g of dicumyl peroxide was prepolymerized at 115° C. internal temperature in a 5 l stirred kettle with a blade stirrer, at a stirrer speed of 200 rpm, until the solids content was 39.2%. Accordingly, the styrene conversion was about 5.7 times the sum of the elastomer constituent in the W6 rubber used and the polybutadiene used. Assuming that the added polybutadiene is completely taken up in the polybutadiene domains of W6, the block polystyrene content of W6 is altered from 70% to 35% ($\tau=24$/cm).

The aqueous phase, and the post-polymerization details, were as in Comparative Example C.

TABLE 2

| Example/ Comparative Example | Polystyrene in the soft component (%) | Ratio of converted styrene to elastomer constituent of the rubber |
| --- | --- | --- |
| C | 44.4 | 1.68 |
| 3 | 47.4 | 3.33 |
| 4 | 52.4 | 4.52 |
| D | 44.7 | 2.30 |
| 5 | 48.7 | 3.79 |
| 6 | 52.7 | 6.56 |
| E | 34.5 | 3.84 |
| 7 | 43.3 | 3.23 |
| 8 | 50.2 | 4.50 |
| 9 | 46.5 | 5.38 |
| 10 | 48.9 | 5.72 |

TABLE 3

| Example/ Comparative Example | Yield stress [N/mm$^2$] | Tensile strength [N/mm$^2$] | Notched impact strength [kJ/m$^2$] | Turbidity $\gamma$ [cm$^{-1}$]. |
| --- | --- | --- | --- | --- |
| C | 20.5 | 15.4 | 14.7 | 63 |
| 3 | 25.7 | 18.2 | 13.4 | 12.6 |
| 4 | 29.9 | 17.4 | 13.9 | 12.8 |
| D | 23.8 | 16.9 | 13.8 | 64 |
| 5 | 27.1 | 18.7 | 14.1 | 18 |
| 6 | 27.6 | 19.0 | 8.3 | 10.6 |
| E | 25.1 | 17.2 | 14.4 | 79 |
| 7 | 28.5 | 18.9 | 9.1 | 23 |
| 8 | 25.6 | 17.6 | 10.2 | 21 |
| 9 | 25.5 | 21.0 | 8.8 | 19 |
| 10 | 24.6 | 17.3 | 9.6 | 24 |

COMPARATIVE EXAMPLE F

In order to show that impact polystyrene disclosed in Table III, column 6 of U.S. Pat. No. 3,660,535 (Finch), which exhibits a particle size of less than 1$\mu$ (range 0.5-1.5$\mu$) and ABS molding compositions disclosed in U.S. Pat. No. 3,883,616 (Hozumi) with a particle size in the same range are not translucent the Product F$^1$ (ABS, Hozumi) and Product F$^2$ (impact polystyrene, Finch) were prepared. The properties of these products were compared with those of product 11, made of a rubber described in Example 3 of this application.

Inasmuch as the apparatus described by Hozumi was not available, a three-stage polymerizer, as described by Finch, was used in all three experiments. In Experiments F$^1$ and 11 dibenzoyl peroxide was used as an initiator, whereas Experiment F$^2$ was carried out thermally, as disclosed by Finch. In Experiments F$^1$ and F$^2$, a polybutadiene HX 535 (cis-polybutadiene containing 10% of 1,2-vinyl) was used as the rubber, which is substantially equivalent to the "Diene 55" used by Finch. In all experiments polymerization was carried out up to a conversion of 80%. The content of rubber in the end product was 15% in each of Experiments $F^1$ and 11 and 8% in Experiment $F^2$.

The products $F^1$, $F^2$ and 11 obtained in the experiments described were blended with the same quantities of lubricants and stabilizers and, under standard conditions, processed into flat injection moldings. These moldings were used to determine the particle size.

Round molded discs 1 mm thick of $F^1$, $F^2$ and 11 were used to measure the turbidity as described.

The experimental results are given in the following Table 4. It can be seen that neither products having the composition disclosed by Hozumi nor the products prepared according to Finch, even when they exhibit a particle size of about 0.8 μm, are translucent. It should be noted that the product $F^2$ having a rubber content of as little as 8% is not even weakly translucent.

TABLE 4

| Product | Type | Particle Size μm | Turbidity γ cm$^{-1}$ |
|---|---|---|---|
| $F^1$ (Hozumi) | ABS | 0.8 | 63 |
| $F^2$ (Finch) | impact PS | 1 | 52 |
| 11 | impact PS | 0.4–0.5 | 12.6 |

We claim:

1. In a process for the manufacture of a high-impact polymer with a turbidity in the range of from 5 to 40/cm consisting essentially of styrene and 1 to 20% by weight of a natural or synthetic rubber by polymerizing styrene in the presence of 1 to 20% by weight, based on styrene, of the rubber in at least two stages, in which in a first stage, the styrene, which contains the rubber in solution, is prepolymerized at from 50° to 150° C. in the presence or absence of inert diluents and/or of initiators which form free radicals, while breaking up the disperse soft-component phase which forms during the polymerization by shearing the polymerization mixture, and thereafter in one or more further stages, the polymerization is completed by taking it to the desired conversion with reduced shearing or entirely without shearing, in mass, in solution or in aqueous suspension, the shearing during the prepolymerization being maintained until the amount of styrene converted, based on the starting solution to be polymerized, corresponds to from 3 to 10 times the amount of elastomer constituent of the total amount of rubber employed, wherein the improvement comprises:

carrying out the shearing during the prepolymerization in such a way that the particles of the disperse soft-component phase thus formed have a weight-average mean diameter of from about 0.2 to 0.6 μm, and the disperse soft-component phase contains, during the prepolymerization, from 35 to 65 percent by weight of free or chemically bonded polystyrene segments with at least 50% by weight of these polystyrene segments being incorporated into the rubber component in a chemically bonded form, as a polymer block or a grafted branch, said segments having a number-average molecular weight of at least 30,000 and below 250,000.

2. The process of claim 1, wherein the rubber is a homopolymer of a conjugated diene of 4 to 6 carbon atoms.

3. The process of claim 1, wherein the rubber is employed in an amount of from 2 to 15 percent by weight based on the starting solution to be polymerized.

4. The process of claim 1, wherein the polymerization in the first stage is carried out in mass in the absence of inert diluents and the polymerization is completed in one or more stages in aqueous suspension.

5. The process of claim 1, wherein the whole polymerization is carried out in solution in the presence of an inert diluent.

6. The process of claim 1, wherein the polymerization in the first stage is carried out at a temperature above 100° C. such that the half-life of the free radical initiator present is less than 30 minutes under the conditions employed and its concentration is from 0.001 to 1.0 mole percent based on the amount of monomeric styrene employed whereby the grafting of the styrene onto the rubber is favored.

7. The process of claim 1, wherein the rubber is polybutadiene.

* * * * *